United States Patent [19]

Koura et al.

[11] Patent Number: 5,449,738
[45] Date of Patent: Sep. 12, 1995

[54] PROCESS FOR PRODUCING ETHYLENE-PROPYLENE BLOCK COPOLYMER

[75] Inventors: Hiroyuki Koura; Takeshi Ebara, both of Ichihara; Kazuki Wakamatsu, Sodegaura; Shouzou Kawamata; Yoshizumi Sasaki, both of Ichihara, all of Japan

[73] Assignee: Sumitomo Chemical Company, Ltd., Osaka, Japan

[21] Appl. No.: 907,017

[22] Filed: Jul. 1, 1992

[30] Foreign Application Priority Data

Jul. 4, 1991 [JP] Japan .................. 3-164232

[51] Int. Cl.$^6$ .......................... C08F 297/08
[52] U.S. Cl. ....................... 525/247; 525/254; 525/270; 525/323
[58] Field of Search ............. 525/247, 254, 270, 323

[56] References Cited

U.S. PATENT DOCUMENTS 4,547,552 10/1985 Toyota et al. ............ 525/247
5,023,223 6/1991 Ebara et al. ............. 502/116

FOREIGN PATENT DOCUMENTS 0368677 5/1990 European Pat. Off. .
0376084 7/1990 European Pat. Off. .
4114833 11/1991 Germany .
61-215613 9/1986 Japan .

OTHER PUBLICATIONS

Chemical Abstracts, vol. 105, No. 9, Nov. 1986, Abstract No. 153688S.

*Primary Examiner*—Romulo H. Delmendo
*Attorney, Agent, or Firm*—Cushman Darby & Cushman

[57] ABSTRACT

The present invention relates to a process for producing ethylene propylene block copolymers excellent in appearance, elongation and impact resistance when molded by a gas phase polymerization which can be conducted in a stable manner.

The process of the present invention comprises the first step of polymerizing propylene by using a catalyst system composed essentially of (A) a solid catalyst component containing magnesium, titanium, and a halogen as the indispensable ingredients,
(B) an organoaluminum compound, and
(C) a silicon compound represented by the formula $R^1R^2Si(OR^3)_2$, wherein $R^1$ is an alicyclic hydrocarbon group and $R^2$ and $R^3$ are each a hydrocarbon group, to form a propylene homopolymer, and the second step of then polymerizing ethylene and propylene with further addition of a silicon compound represented by the formula $R^4R^5_aSi(OR^6)_{3-a}$, wherein $R^4$ is an aromatic hydrocarbon group, $R^5$ is a hydrocarbon group or an aromatic hydrocarbon group, and a is a number satisfying the equation $0 \leq a < 3$, to form an ethylene-propylene copolymer.

7 Claims, No Drawings

PROCESS FOR PRODUCING ETHYLENE-PROPYLENE BLOCK COPOLYMER

The present invention relates to a process for producing ethylene-propylene block copolymers by gas phase polymerization.

In polymerization of olefins such as ethylene, propylene, etc., the performance characteristic of the polymerization catalyst used therefor has markedly advanced and the yield of polymer per unit weight of catalyst component has drastically improved in recent years, so that little of the transition metal catalyst component remains in the resulting polymer and the elimination of catalyst removal step has been possible.

Processes in use for the polymerization of these olefins include the slurry polymerization process conducted in inert hydrocarbon solvents, the bulk polymerization process conducted in liquified monomers such as liquefied propylene, and the gas phase polymerization process conducted in a gas phase. Among them, the gas phase polymerization method has come to attract much attention because, no solvent is used in the process, the steps of the recovery and purification of solvents are unnecessary and the recovery of the monomer and the drying of the polymerization products can be easily accomplished.

In the field of block copolymers of ethylene and propylene, there is known a gas phase block copolymerization process, wherein in the early stage propylene polymer is produced, and in the later stage ethylene is polymerized or ethylene and propylene are copolymerized in a gas phase.

The gas phase block copolymerization process, as compared with processes in which the latter stage polymerization is conducted in inert hydrocarbon solvents or conducted in liquid propylene, has the advantage of permitting the production of increased varieties of product polymer, in addition to the economical advantages mentioned above.

However, as compared to the early stage polymerization step in which usually propylene alone is polymerized or an ethylene-propylene copolymer containing a small amount of ethylene is produced, in the later stage polymerization step, in which ethylene and propylene are polymerized to produce a copolymer having a higher content of ethylene than in the early stage polymerization, the polymerization velocity is high and hence the control of polymerization ratio in the latter stage is difficult, which results in a markedly increased amount of polymer of low stereospecificity or amorphous polymer. Resultantly, the quality of the product is adversely affected. Moreover, lumps of polymer due to sticking of individual polymer particles to one another tend to form in the polymerization vessel, build-up of polymer onto the polymerization vessel tends to form, and blockage of piping and sticking of polymer in silos and hoppers are apt to occur. This not only makes it difficult to maintain normal operation but further adversely affects the present quality secondarily.

To solve the problems of the prior art mentioned above, the present invention provides a process for producing ethylene propylene block copolymers by gas phase polymerization which can maintain the polymerization reaction in a stable manner without forming lumps of polymer or the like and can give ethylene-propylene block copolymers excellent in appearance, elongation and impact resistance when molded.

According to the present invention, there is provided a process for producing ethylene-propylene block copolymers by gas phase polymerization which comprises the first step of polymerizing propylene or a mixture of ethylene and propylene in single stage or in plural stage by use of a catalyst system composed essentially of (A) a solid catalyst component containing magnesium, titanium and a halogen as the indispensable ingredients,
(B) an organoaluminum compound, and
(C) a silicon compound represented by the formula $R^1R^2Si(OR^3)_2$, wherein $R^1$ is an alicyclic hydrocarbon group of 5–20 carbon atoms and $R^2$ and $R^3$ are each a hydrocarbon group of 1–20 carbon atoms, to form a propylene homopolymer or an ethylene propylene copolymer having an ethylene content of 3% by weight or less in an amount corresponding to 50–95% by weight of the total polymerization amount, and the second step of then polymerizing a mixture of ethylene and propylene in single stage or in plural stages with further addition of a silicon compound represented by the formula $R^4R^5_aSi(OR^6)_{3-a}$, wherein $R^4$ is an aromatic hydrocarbon group of 6–20 carbon atoms, $R^5$ is a hydrocarbon group of 1–20 carbon atoms or an aromatic hydrocarbon group of 6–20 carbon atoms, $R^6$ is a hydrocarbon group of 1–20 carbon atoms, and a is a number satisfying the equation $0 \leq a < 3$, to form an ethylene-propylene copolymer having an ethylene content of at least 20% by weight in an amount corresponding to 5–50% by weight of the total polymerization amount.

The present invention will be described in detail below.

The solid catalyst component (A) used in the present invention contains titanium, magnesium and a halogen as the indispensable ingredients and is generally obtained by reducing a titanium compound with an organomagnesium compound, treating the resulting solid product with an ester compound and then treating it with titanium tetrachloride.

The titanium compound used is represented by the formula $Ti(OR)_bX_{4-b}$, wherein R is a hydrocarbon group of 1–20 carbon atoms, X is a halogen atom, and b is a number satisfying the equation $0 < b \leq 4$.

As specific examples of R mentioned may be made of alkyl groups such as methyl, ethyl, propyl, isopropyl, butyl, isobutyl, amyl, isoamyl, hexyl, heptyl, octyl, decyl, dodecyl, etc.; aryl groups such as phenyl, cresyl, xylyl, naphthyl, etc.; cycloalkyl groups such as cyclohexyl, cyclopentyl, etc.; allyl groups such as propenyl, etc.; and aralkyl groups such as benzyl, etc.

As the magnesium component, there may be used any type of organomagnesium compounds containing a magnesium-carbon bond. Particularly preferred are Grignard compound represented by the formula RMgX, wherein R is a hydrocarbon group of 1–20 carbon atoms and X is a halogen, and magnesium compounds represented by the formula RR′Mg, wherein R and R′ may be the same or different and comprise a hydrocarbon group of 1–20 carbon atoms.

As examples of the Grignard compound, mention may be made of methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, phenylmagnesium chloride, phenylmagnesium bromide, etc. As examples of the magnesium compound represented by RR'Mg, mention may be made of diethylmagnesium, dipropylmagnesium, diisopropylmagneisum, dibutylmagnesium, di-sec-butylmagnesium, di-tertbutylmagnesium, diamylmagnesium, diphenylmagnesium, etc.

The organoaluminum compounds (B) used in combination with the solid catalyst compound (A) are those which contain at least one Al—C bond in the molecule.

Specific examples of such organoaluminum compounds include trialkylaluminums such as triethylaluminum, triisobutylaluminum, trihexylaluminum, etc.; dialkylaluminum halides such as diethylaluminum halides, diisobutylaluminum halides, etc.; mixtures of trialkylaluminum and diethylaluminum halides; and alkylalumoxanes such as tetraethyldialumoxane, tetrabutyldialumoxane, etc.

Among these organoaluminum compounds, preferred are trialkylaluminum, mixtures of trialkylaluminum and dialkylaluminum halides, and alkylalumoxanes, and particularly preferred are triethylaluminum, triisobutylaluminum, a mixture of triethylaluminum and diethylaluminum chloride and tetraethyldialumoxane.

The amount of the organoaluminum compound to be used can be selected from as wide a range as 1–1000 moles, but preferably from the range of 5–600 moles, per one mole of titanium atoms in the solid catalyst.

As the electron donors, there are used two kinds of electron donors, (C) and (C'), which contain silicon.

The electron donor (C) used in the first step is a silicon compound represented by the formula $R^1R^2Si(OR^3)_2$, wherein $R^1$ is an alicyclic hydrocarbon group of 5–20 carbon atoms, and $R^2$ and $R^3$ are each a hydrocarbon group of 1–20 carbon atoms. Specific examples of such silicon compounds are shown below.

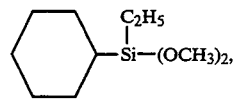 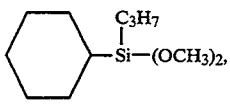

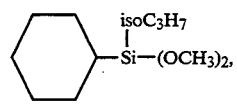 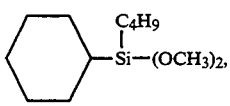

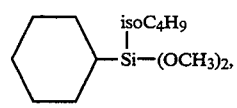 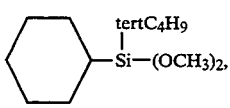

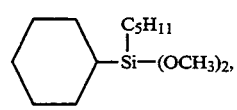 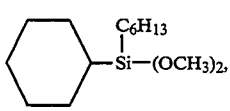

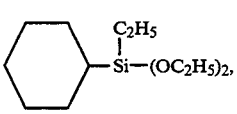 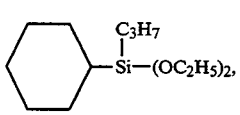

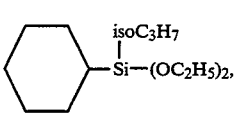 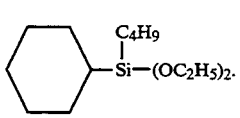

The electron donor (C') used in the second step is a silicon compound represented by the formula $R^4R^5Si(OR^6)_{3-a}$, wherein $R^4$ is an aromatic hydrocarbon group of 6–20 carbon atoms, $R^5$ is a hydrocarbon group of 1–20 carbon atoms or an aromatic hydrocarbon group of 6–20 carbon atoms, $R^6$ is a hydrocarbon group of 1–20 carbon atoms, and a is a number satisfying the equation $0 \leq a < 3$.

Specific examples of such silicon compounds are shown below.

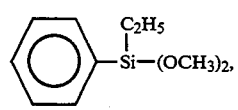 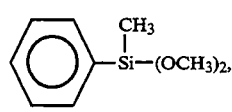

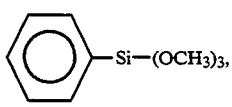 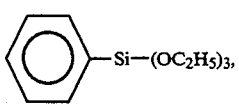

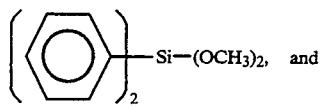

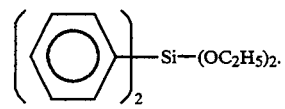

In the present invention, ethylene-propylene block copolymerization is conducted in the presence of a catalytic system consisting essentially of the components (A), (B), (C) and (C') mentioned above.

In the first step, a highly crystalline polymer of high stereospecificity is produced by homopolymerization of propylene or copolymerization of propylene with a small amount of 3% by weight or less, preferably 1.5% by weight or less, of ethylene.

In the homopolymerization of propylene or copolymerization of propylene with a small amount of ethylene mentioned above, the catalyst components (A), (B) and (C) are supplied to the polymerization system. The components (A), (B) and (C) may be supplied to the polymerization system either each independently or after preliminarily mixing two or three components.

As to the amount of the respective catalyst components to be used, the amount of the component (A) is 0.005–0.5, preferably 0.01–0.3 mmol, in terms of gram-atom of titanium per 1 l of the polymerization volume, and the component (B) is preferably used so as to give a molar ratio of Al in the component (B) to Ti in the component (A) of 1–1000, preferably 5–600. The component (C) is preferably used so as to give a molar ratio of the component (C) to Ti in the component (A) of 0.05–500, preferably 0.1–200.

The polymerization temperature is 20°–200° C., preferably 50°–90° C. The polymerization pressure is from atmospheric pressure to 100 kg/cm²G, preferably 2–50 kg/cm²G.

In the first step of conducting the homopolymerization of propylene or copolymerization of propylene with a small amount of ethylene, the polymerization is preferably conducted so as to give an amount of polymer corresponding to 50–95% by weight, preferably 60–90% by weight, of the total polymerization amount of the ethylene-propylene block copolymer ultimately obtained. The first step may also be conducted in two or more stages; in this case the polymerization conductions in respective stages may be different from one another. Further, according to necessity, hydrogen is supplied to the reaction system to control the intrinsic viscosity [η] of the polymer formed.

In the second step, then, an ethylene propylene copolymer containing at least 20% by weight of ethylene is produced in the range of amount of 5–50% by weight, preferably 10–40% by weight, of the total polymerization amount of the ethylene-propylene block copolymer. In the second step, the catalyst component (C') is further added to the catalyst components (A), (B) and (C) added in the first step.

The component (C') is added in such an amount as to give a molar ratio of the component (C') to Ti in the component (A) of 1–500, preferably 5–200. The polymerization temperature is 20°–200° C., preferably 50°–90° C., and the polymerization pressure is from atmospheric pressure to 100 kg/cm$^2$G, preferably 2–50 kg/cm$^2$G.

The ethylene-propylene copolymer formed in the second step is controlled by using hydrogen so as to have an intrinsic viscosity [η] of 0.5–7.0, preferably 0.5–5.0, more preferably 1.0–4.0, as determined in decalin at 135° C.

The second step may also be conducted in two or more stages. In this case, the polymerization conditions in respective stages may be different from one another.

DESCRIPTION OF THE PREFERRED EMBODIMENTS

The present invention is described in more detail below with reference to Examples and Comparative Examples, but the Examples should not be construed as limiting the scope of the present invention. That is, it should be understood that we intend to cover by the appended claims all modifications falling under the true spirit and scope of our invention.

The properties of polymer shown in Examples were determined in the following manner.

(1) MI

This was determined in accordance with the method specified in JIS K 6758, at a measuring temperature of 230° C. and a load of 2.16 kg/cm$^2$.

(2) FE (fish eye)

A 1000 cm$^2$ piece was cut out from a T-die extrusion film of 30 μm thickness, and the number of fish eyes having a diameter of 200 μm or more was determined by using a peak scale of 10 magnifications. Polymers with a small number of FE give a good appearance in molding.

(3) Tensile property

In accordance with the method specified in ASTM D 638, tensile yield strength and tensile elongation were determined with a test piece of 3.2 mm thickness at a measuring temperature of 23° C.

(4) Flexural property

In accordance with the method specified in JIS K 7203, flexural modulus of elasticity was determined with a test piece of 3.2 mm thickness under conditions of a span length of 50 mm, loading velocity of 1.5 mm/min and measuring temperature of 23° C.

(5) Izod impact strength

In accordance with the method specified in JIS K 7110, impact strength with knotch was determined with a test piece of 3.2 mm thickness at measuring temperatures of 23° C. and −23° C.

(6) Falling weight impact strength

Resin was injection-molded into a sheet 1 mm in thickness, and a disk having a diameter of 66 mm was punched out from the sheet and used as a test piece. The test piece was conditions at 23° C. and 50% RH for at least 40 hours, then kept at a measuring temperature (0° C. or −20° C.) for at least 2 hours, and thereafter its fracture strength was determined with a duPont impact tester using weights of 0.10–3 kg.

(7) Ethylene content

Ethylene content was determined from the infrared absorption spectrum.

REFERENCE EXAMPLES (a) Synthesis of organomagnesium compound

A 1-l flask fitted with a stirrer, reflux condenser, dropping funnel and thermometer was flushed with argon gas, and 32.0 g of magnesium turnings for Grignard reagent were placed in the flask. Into the dropping funnel were charged 120 g of butyl chloride and 500 ml of dibutyl ether, and about 30 ml of the resulting mixture was added dropwise onto the magnesium in the flask to initiate the reaction. After the initiation of the reaction, the dropwise addition was continued at 50° C. over a period of hours. After completion of the addition, the reaction was continued at 60° C. for further 1 hour. Thereafter the reaction liquid was cooled to room temperature and then filtered to remove solid materials.

The concentration of butylmagnesium chloride in dibutyl ether in the filtrate was determined by hydrolyzing the filtrate with 1-N sulfuric acid, followed by back titration with a 1-N aqueous sodium hydroxide solution using phenolphthalein as an indicator. It was found to be 2.1 mol/l.

(b) Synthesis of solid product

A 500-ml flask fitted with a stirred and dropping funnel was flushed with argon gas, and 240 ml of hexane, 5.4 g (15.8 mmols) of tetrabutoxytitanium and 61.4 g (295 mmols) of tetraethoxysilane were charged thereinto to form a uniform solution. Then, 150 ml of the organomagnesium compound synthesized in (a) above was gradually added dropwise from the dropping funnel over a period of 4 hours while keeping the temperature in the flask at 5° C. After completion of the dropwise addition, the reaction mixture was stirred for further 1 hour at room temperature and then separated at room temperature into solid and liquid. The solid was washed 3 times with 240 ml of hexane, and then dried under reduced pressure to obtain 45.0 g of a dark-brown solid product.

The solid product contained 1.7% by weight of titanium atoms, 33.8% by weight of ethoxy groups and 2.9% by weight of butoxy groups.

The wide angle X-ray diffraction pattern obtained by using Cu-Ka line, of the solid product showed utterly no distinct diffraction peak, revealing that the product was of an amorphous structure.

(c) Synthesis of ester-treated solid

A 100-ml flask was flushed with argon gas, then 6.5 g of the solid product synthesized in (b) above, 16.2 ml of toluene, and 4.3 ml (16 mmols) of diisobutyl phthalate were placed therein and the mixture was allowed to react at 95° C. for 1 hour.

After completion of the reaction, the reaction mixture was separated into solid and liquid, and the solid was washed 3 times with 33 ml of toluene.

(d) Synthesis of solid catalyst (activation treatment)

After completion of the washing in (c) above, 16.2 ml of toluene, 0.36 ml (,1.3 mmols) of diosobutyl phthalate, 2.2 ml (13 mmols) of butyl ether and 38.0 ml (346 mmols) of titanium tetrachloride were added to the washed product in the flask and reacted at 95° C. for 3 hours. After completion of the reaction the reaction mixture was separated at 95° C. into liquid and solid, and the solid was washed twice with 33 ml of toluene at 95° C. The aforementioned treatment with a mixture of diisobutyl phthalate, butyl ether and titanium tetrachloride was further repeated once more under the same conditions, and the solid thus treated was washed 3 times with 33 ml of hexane to obtain 5.0 g of an ocherous solid catalyst.

The solid catalyst contained 2.1% by weight of titanium atoms, 19.9% by weight of magnesium atoms and 2.7% of the phthalic acid ester.

Example 1

(a) Catalyst component

A 250-l reactor fitted with a stirrer was charged with 150 l of a thoroughly purified hexane, then the atmosphere in the system was replaced thoroughly with nitrogen, and 3.2 mols of triethylaluminum (hereinafter abbreviated as TEA), 0.32 mols of cyclohexylethyldimethoxysilane (hereinafter abbreviated as CHEDMS) and 51.8 g, in terms of Ti atoms, of the solid catalyst obtained in reference Example (d) were added to the system. Then, 5.6 kg of propylene was added continuously over a period of 2 hours while keeping the temperature at 25° C.

(b) Polymerization

An apparatus comprising 3 gas phase polymerization reactor connected in series was used. The three reactors (each having a volume of 1000 l) are respectively referred to as the reactors X, Y and Z. Homopolymerization of propylene was conducted in the reactors X and Y. In the polymerization, the pressure was 21 kg/cm$^2$G in the reactor X and 17 kg/cm$^2$G in the vessel Y, and the temperature was 75° C. in both the vessel X and the reactor Y. The catalyst component prepared in (a) above was diluted with hexane and fed continuously into the reactor X at a rate of 23 mg/hour in terms of Ti atoms, so that the total average residence time in reactors X and Y would be 4 hours. Concurrently, 50 mmols/hour of TEA and 5 mmols/hour of CHEDMS were fed into the reactor X, and further hydrogen was fed continuously so as to give a hydrogen concentration in reactors X and Y of 1.2%.

The polymer discharged from the reactor Y was transferred to the reactor Z, wherein propylene and ethylene were polymerized at a pressure of 12 kg/cm$^2$G, a temperature of 70° C. and a residence time of 1 hour. Ethylene, propylene and hydrogen were supplied so as to give an ethylene concentration of 27% and a hydrogen concentration of 0.7%. Further, phenyltrimethoxysilane (hereinafter abbreviated as PTMS) was continuously supplied so as to give a molar ratio of PTMS to titanium in the catalyst component of 30.

The ethylene-propylene block copolymer obtained had a MI of 8.9, and showed a catalyst activity of 40,000 g PP/mmol Ti. The polymerization amount in the reactor Z (hereinafter referred to as "EP content") was 15% by weight relative to the total amount of the ethylene-propylene block copolymer obtained. The polymerization progressed in a stable manner. The composition and the property of the polymer obtained are shown in Table 1.

Example 2

Polymerization was conducted in the same manner as in Example 1 except that hydrogen and PTMS were respectively supplied so as to give a hydrogen concentration in the reactors X, Y and Z of 0.45% and a molar ratio of PTMS to titanium in the catalyst component of 40. The ethylene-propylene block copolymer obtained had a MI of 2.9 and showed a catalyst activity of 40,000 g PP/mmol Ti. The EP content was 16.5% by weight relative to the total amount of the ethylene-propylene block copolymer obtained. The polymerization progressed in a stable manner. The composition and the property of the polymer are shown in Table 1.

Example 3

Polymerization was conducted in the same manner as in Example 1 except that hydrogen and PTMS were respectively supplied so as to give a hydrogen concentration in the reactors X, Y and Z of 1.70% and a molar ratio of PTMS to titanium in the catalyst component of 20. The ethylene-propylene block copolymer obtained had a MI of 15.0 and showed a catalyst activity of 39,000 g PP/mmol Ti. The EP content was 14.0% by weight relative to the total amount of the ethylene-propylene block copolymer obtained. The polymerization progressed in a stable manner. The composition and the property of the polymer obtained are shown in Table 1.

Comparative Example 1

Polymerization was conducted in the same manner as in Example 1 except that no PTMS was supplied to the reactor Z. The ethylene-propylene block copolymer obtained had a MI of 7.3 and showed a catalyst activity of 42,000 g PP/mmol Ti. The EP content was 15.0% by weight relative to the total amount of the ethylene-propylene copolymer obtained. The composition and the property of the polymer obtained are shown in Table 2.

Comparative Example 2

Polymerization was conducted in the same manner as in Example 2 except that no PTMS was supplied to the reactor Z. The ethylene-propylene block copolymer obtained had a MI of 2.9 and showed a catalyst activity of 40,000 g PP/mmol Ti. The EP content was 16.5% by weight relative to the total amount of the ethylene-propylene block copolymer obtained. The compositions and the property of the polymer obtained are shown in Table 2.

Comparative Example 3

Polymerization was conducted in the same manner as in Example 3 except that no PTMS was supplied to the reactor Z. The ethylene-propylene block copolymer obtained had a MI of 13.3 and showed a catalyst activity of 40,000 g PP/mmol Ti. The EP content was 14.0% by weight relative to the total amount of the ethylene-propylene copolymer obtained. The compositions and the property of the polymer obtained are shown in Table 2.

TABLE 1

|  | Example 1 | Example 2 | Example 3 | Comparative 1 | Comparative 2 | Comparative 3 |
| --- | --- | --- | --- | --- | --- | --- |
| MI (g/10 min) | 8.9 | 2.9 | 15.0 | 7.3 | 3.0 | 13.3 |
| EP content (wt %) | 15.0 | 16.5 | 14.0 | 15.0 | 16.5 | 14.0 |
| Ethylene content (wt %)[1] | 38.0 | 42.0 | 37.9 | 38.0 | 40.0 | 40.0 |
| Tensile property |  |  |  |  |  |  |
| Yield stress (kg/cm$^2$) | 278 | 256 | 297 | 270 | 258 | 250 |

TABLE 1-continued

|  | Example 1 | Example 2 | Example 3 | Comparative 1 | Comparative 2 | Comparative 3 |
|---|---|---|---|---|---|---|
| Elongation at break (%) | 690 | 740 | 130 | 150 | 230 | 124 |
| Flexural property | | | | | | |
| Modulus of elasticity (kg/cm$^2$) | 14000 | 11800 | 14200 | 14600 | 11400 | 13500 |
| Izod-impact strength | | | | | | |
| 23° C. (kg/cm · cm) | 16.2 | 35.6 | 8.6 | 7.4 | 37.8 | 6.8 |
| −20° C. (kg/cm · cm) | 3.4 | 4.1 | 2.8 | 4.1 | 3.6 | 3.5 |
| Falling weight impact strength | | | | | | |
| 0° C. (kg/cm · cm) | 73 | 80 | 70 | 43 | 65 | 47 |
| −20° C. (kg/cm · cm) | 58 | 80 | 40 | 36 | 62 | 29 |
| FE (member/1000 cm$^2$) | 7 | 3 | 23 | 152 | 113 | 202 |

Note:
[1] Ethylene content of ethylene-propylene copolymer portion (i.e., EP portion)

According to the present invention, polymerization can be conducted in a stable manner, and ethylene-propylene block copolymers excellent in appearance, elongation and impact strength when molded can be obtained.

What is claimed is:

1. A process for producing ethylene-propylene block copolymers by gas phase polymerization which comprises:
   the first step of polymerizing propylene or a mixture of ethylene and propylene in single stage or in plural stages in the presence of a catalyst system consisting essentially of
   (A) a solid catalyst component containing magnesium, titanium and a halogen as the indispensable ingredients,
   (B) an organoaluminum compound, and
   (C) a first silicon compound selected from the group consisting of compounds having the following structural formulas,

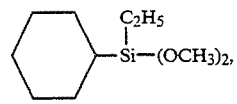 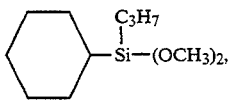

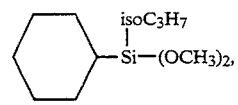 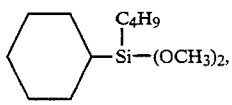

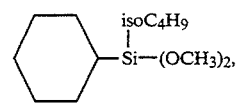 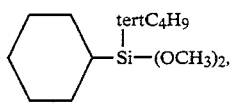

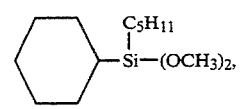 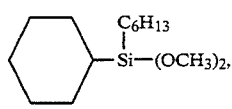

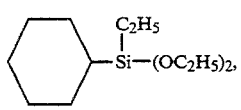 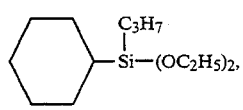

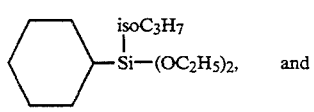 and

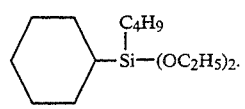

to form a propylene homopolymer or ethylene-propylene copolymer having an ethylene content of 3% by weight or less in an amount corresponding to 50–95% by weight of the total polymerization amount, and
   the second step of then, in the further presence of the first polymerization product, polymerizing a mixture of ethylene and propylene in single stage or in plural stages with further addition of a second silicon compound selected from the group consisting of compounds having the following structural formulas,

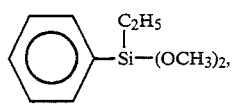 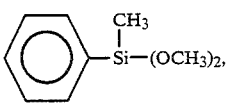

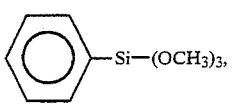 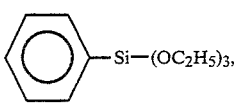

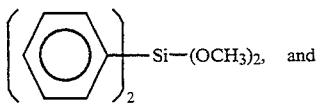 and

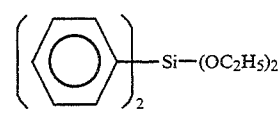

to form an ethylene-propylene copolymer having an ethylene content of at least 20% by weight in an amount corresponding to 5–50% by weight of the total polymerization amount.

2. The process according to claim 1 wherein the first polymerization product from the first step is a propylene homopolymer.

3. The process according to claim 1, wherein said organo aluminum compound is a trialkyl aluminum compound.

4. The process according to claim 1, wherein said first silicon compound is cyclohexylethyldimethoxysilane and said second silicon compound is phenyltrimethoxysilane.

5. The process according to claim 1, wherein said catalyst component is obtained by reducing a titanium compound with an organomagnesium compound, treating the resultant solid product with an ester compound and then with a titanium tetrahalide, wherein said titanium compound has the formula $Ti(OR)_b X_{4-b}$, wherein R is a hydrocarbon group of 1-20 carbon atoms, X is a halogen atom, and b is a number satisfying the equation $0 < b \leq 4$.

6. The process according to claim 5, wherein said organomagnesium compound has the formula RMgX or RR'Mg wherein R is a hydrocarbon group of 1-20 carbon atoms,
X is a halogen atom, and
R' is a hydrocarbon group of 1-20 carbon atoms.

7. The process according to claim 1, wherein said catalyst component containing an organoaluminum compound is an organoaluminum compound containing at least one Al—C bond in the molecule.

* * * * *